(12) United States Patent
Allen et al.

(10) Patent No.: US 9,610,824 B2
(45) Date of Patent: Apr. 4, 2017

(54) POWER SUPPLY SYSTEM FOR A VEHICLE CLIMATE CONTROL UNIT

(71) Applicant: Dometic Corporation, Elkhart, IN (US)

(72) Inventors: Kendall E Allen, Bumpass, VA (US); Louis Seigel, Williamsburg, VA (US); James C Elliott, Mechanicsville, VA (US)

(73) Assignee: Dometic Corporation, Elkhart, IN (US)

( * ) Notice: Subject to any disclaimer, the term of this patent is extended or adjusted under 35 U.S.C. 154(b) by 477 days.

(21) Appl. No.: 13/855,244

(22) Filed: Apr. 2, 2013

(65) Prior Publication Data

US 2013/0220588 A1 Aug. 29, 2013

Related U.S. Application Data

(62) Division of application No. 11/687,883, filed on Mar. 19, 2007, now abandoned.

(Continued)

(51) Int. Cl.
*B60H 1/32* (2006.01)
*B60H 1/00* (2006.01)
*H01M 2/10* (2006.01)
*B23P 19/00* (2006.01)
*H01M 10/06* (2006.01)

(52) U.S. Cl.
CPC .......... *B60H 1/00428* (2013.01); *B23P 19/00* (2013.01); *H01M 2/1072* (2013.01); *B60H 1/00378* (2013.01); *H01M 10/06* (2013.01); *Y10T 29/49826* (2015.01)

(58) Field of Classification Search
CPC .. B60H 1/00428; B23P 19/00; H01M 2/1072; H01M 10/06; Y10T 29/49826
See application file for complete search history.

(56) References Cited

U.S. PATENT DOCUMENTS 5,046,327 A 9/1991 Walker et al.
5,265,435 A 11/1993 Richardson
(Continued)

OTHER PUBLICATIONS

Bergstrom, Installation Instructions Model 9000i, Post Jun. 2002, Date archived Jan. 1, 2006, http://web.archive.org/web/20060102045444/www.nitesystem.com/index.cfm/info?cat=38, 34 pages.*

(Continued)

*Primary Examiner* — Jonathan Bradford
(74) *Attorney, Agent, or Firm* — Middleton Reutlinger

(57) ABSTRACT

A truck includes an alternator having a direct current electrical power output. The truck also includes a combined inverter and charger unit having an alternating current electrical power output, a house battery and a starting battery. The combined inverter and charger unit is configured to charge the house battery and the starting battery. The truck further includes a day cab forming an interior space and a climate control unit for conditioning the interior space of the day cab. The climate control unit is adapted to be powered by an alternating current electrical source. The climate control unit is powered by the alternator through the combined inverter and charger unit when an engine of the truck engine is running, and is powered by the house battery or the starting through the combined inverter and charger unit when the engine is not running.

19 Claims, 3 Drawing Sheets

Related U.S. Application Data

(60) Provisional application No. 60/784,336, filed on Mar. 21, 2006.

(56) References Cited

U.S. PATENT DOCUMENTS

| | | | | |
|---|---|---|---|---|
| 5,583,413 | A * | 12/1996 | Proctor et al. | 320/134 |
| 5,899,081 | A | 5/1999 | Evans et al. | |
| 6,889,762 | B2 | 5/2005 | Zeigler et al. | |
| 7,151,326 | B2 | 12/2006 | Jordan | |
| 2002/0104321 | A1 | 8/2002 | Odachi et al. | |
| 2003/0141049 | A1 | 7/2003 | Kennedy | |
| 2004/0231831 | A1* | 11/2004 | Houck | B60H 1/3226 165/202 |
| 2004/0262062 | A1* | 12/2004 | Berbari | 180/165 |
| 2005/0063121 | A1* | 3/2005 | Jordan | B60L 1/003 361/103 |
| 2005/0257543 | A1* | 11/2005 | Martin | B60H 1/00378 62/228.1 |
| 2006/0023480 | A1* | 2/2006 | Plummer | B60H 1/00278 363/146 |
| 2006/0248907 | A1* | 11/2006 | Allen et al. | 62/183 |
| 2007/0175230 | A1* | 8/2007 | Plummer et al. | 62/236 |

OTHER PUBLICATIONS

Sure Power Industries, Inc., Battery Separator The Smart Solenoid, Date Archived Jun. 11, 2004, http://web.archive.org/web/20040611165700/www.surepower.com/pdf/180074c.pdf, 3 pages.*

"Real Solutions. Now." www.idling solutions.com; Copyright 2004 Idling Solutions, LLC, 4 pages.

Bergstrom; Installation Instructions Model 9000i, Post Jun. 2002; Date archived Jan. 1, 2006; http://web.archive.org/web/20060102045444/www.nitesystem.com/index.cfm/info?cat=38; 34 pages.

Sure Power Industries, Inc.; "Battery Separator the Smart Solenoid"; Date Archived Jun. 11, 2004; http://web.archive.org/web/20040611165700/www.surepower.com/pdf/180074c.pdf; 3 pages.

Idling Solutions; Real Solutions. Now. www.idling solutions.com; Copyright 2004.

Bergstrom; Installation Instructions Model 9000i, Post Jun. 2002; Date archived Jan. 1, 2006.

Sure Power Industries, Inc. Battery Separator the Smart Solenoid; Date archived Jun. 11, 2004.

Werner Juk Baudelio & Cia., S.C.; Translation of Mexican Office Action in MX/a/2007/003288 Jul. 7, 2011.

* cited by examiner

POWER SUPPLY SYSTEM FOR A VEHICLE CLIMATE CONTROL UNIT

CROSS-REFERENCE TO RELATED APPLICATIONS

This application is a divisional application of application Ser. No. 11/687,883, which was filed on Mar. 19, 2007 and claims the benefit of U.S. Provisional Application No. 60/784,336, filed Mar. 21, 2006, the entire disclosures of which are incorporated herein by reference.

BACKGROUND OF THE INVENTION

Field of the Invention

The present invention relates generally to vehicle electrical power supply systems, and more particularly to vehicle electrical power supply systems that are adapted to supply power to vehicle-mounted heating, ventilation, and air conditioning (HVAC) systems when the vehicle's engine is not running.

BRIEF SUMMARY OF THE INVENTION

In accordance with one aspect, provided is a truck including an alternator having a direct current electrical power output. The truck also includes a combined inverter and charger unit having an alternating current electrical power output, a house battery and a starting battery. The combined inverter and charger unit is configured to charge both of the house battery and the starting battery. The truck further includes a day cab forming an interior space and a climate control unit for conditioning the interior space of the day cab. The climate control unit is adapted to be powered by an alternating current electrical source. The climate control unit is powered by the alternator through the combined inverter and charger unit when an engine of the truck is running and powered by the starting battery or the house battery through the combined inverter and charger unit when the engine is not running.

Further provided is a truck including an engine, an alternator driven by the engine, and a starter motor for starting the engine. The truck further includes a combined inverter and charger unit having an alternating current electrical power output. A day cab on the truck forms an interior space. A climate control unit conditions the interior space of the day cab. The climate control unit is adapted to be powered by an alternating current electrical source. The climate control unit is powered by the alternator through the combined inverter and charger unit when the engine is running. A battery for supplying electrical energy to the starter motor also supplies electrical energy to the climate control unit through the combined inverter and charger unit to power the climate control unit when the engine is not running. The combined inverter and charger unit is configured to charge the battery.

In accordance with another aspect, a method of modifying a truck is provided and comprises the step of providing the truck where the truck includes an alternator having a direct current electrical power output, a house battery, a starting battery, a day cab forming an interior space, and a heating system for heating the interior space of the day cab. The method further comprises the step of installing a combined inverter and charger unit on the truck where the combined inverter and charger unit has an alternating current electrical power output. The method further comprises the step of installing an auxiliary HVAC unit on the truck. The auxiliary HVAC unit is adapted to be powered by an alternating current electrical source. The auxiliary HVAC unit is powered by the house battery or the starting battery through the combined inverter and charger unit when an engine of the truck is not running.

DETAILED DESCRIPTION

Described herein is a vehicle electrical power supply system for supplying power to a vehicle-mounted HVAC unit. The system is adapted to supply power to the HVAC unit when the vehicle's engine is running or not running. Accordingly, the power supply system allows the HVAC unit to be operated without idling the engine when the vehicle is parked.

As used herein, the terms "HVAC unit" and "climate control unit" refer generally to a device for conditioning a space, which can include one or more of the following functions: heating, cooling, ventilating, air handling, humidifying, and dehumidifying. The terms "HVAC unit" and "climate control unit" are used interchangeably.

Figure 1:
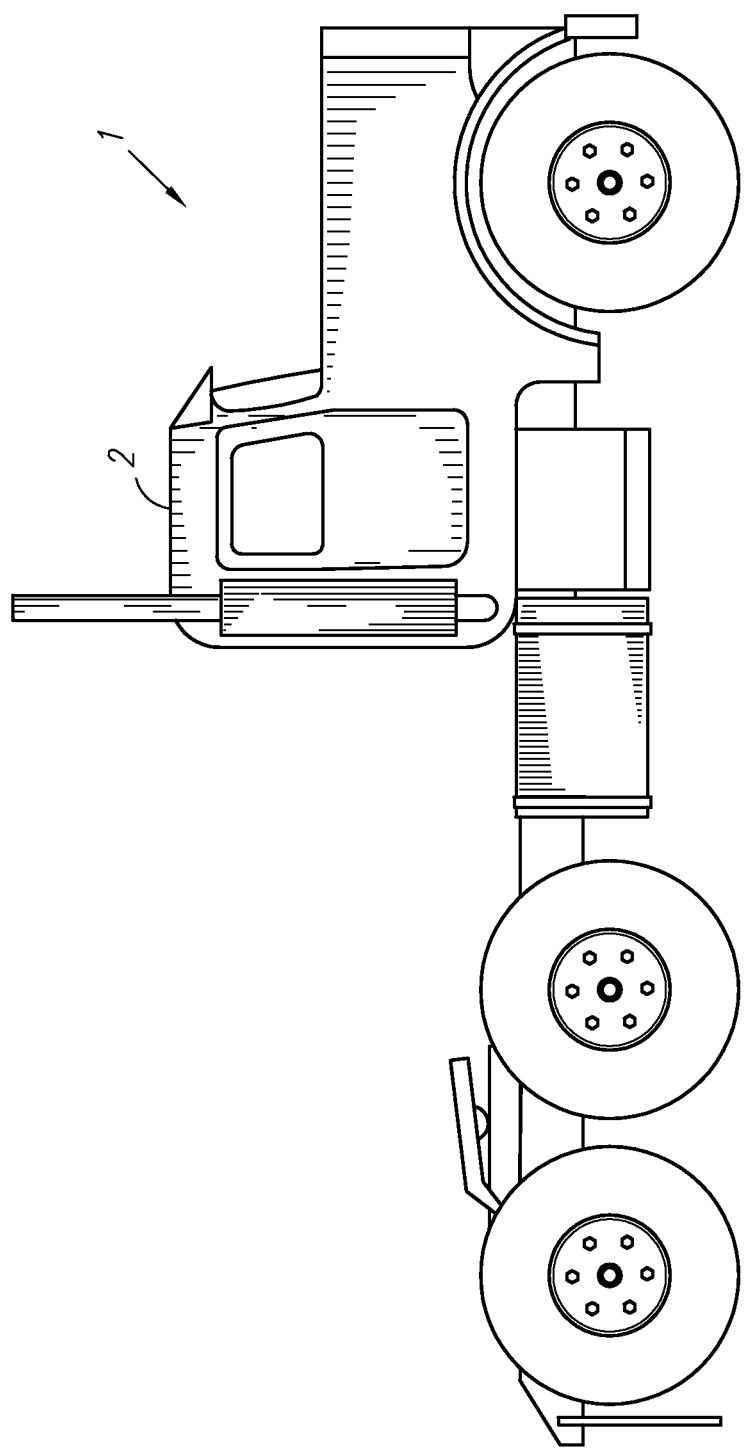
FIG. 1 is a side elevation view of a truck having a day cab.

As used herein, the term "truck" refers to a self-propelled vehicle, having an internal combustion engine, for transporting various things (e.g., freight, livestock, etc.). The term "truck" includes a highway tractor that is adapted to pull a semitrailer. An example truck 1 is shown in FIG. 1. The truck 1 includes a day cab 2. The day cab 2 is a truck cab having no driver sleeping compartment. A truck cab that includes a driver sleeping compartment is conventionally known as a "sleeper cab." The day cab 2 is smaller than a sleeper cab because it lacks a sleeping compartment.

The day cab 2 forms an interior space. An HVAC system conditions the interior space within the day cab 2. The HVAC system may be an auxiliary HVAC unit that is auxiliary to the truck's main heating and air conditioning system. In an embodiment, the auxiliary HVAC unit is sized specifically to effectively condition the interior space within the day cab 2. That is, the heating, cooling, ventilating, air handling, humidifying and/or dehumidifying capacity of the day cab HVAC unit is designed specifically to condition a space within a day cab. Because a day cab HVAC unit is designed to condition a smaller space than a sleeper cab HVAC unit, the day cab HVAC unit consumes less energy when running.

In an example embodiment, the day cab HVAC unit has a conditioning capacity rating, for example, a cooling capacity rating, that is not greater than 10,000 British thermal units per hour (Btu/hr) or 2,930 watts (W). In an example embodiment, the day cab HVAC unit has a conditioning capacity rating that is not greater than 7,000 Btu/hr or 2,051 W. In an example embodiment, the day cab HVAC unit has a conditioning capacity rating that equals 10,000 Btu/hr or 2,930 W. In an example embodiment, the day cab HVAC unit has a conditioning capacity rating that equals 7,000 Btu/hr or 2,051 W.

An HVAC unit for a day cab can be chosen based on the volume of the interior space of the day cab and the conditioning capacity ratings of available HVAC units. For example, the smallest effective HVAC unit (e.g., the unit having the smallest suitable conditioning capacity rating) can be chosen for a day cab so that a minimum amount of energy is required to operate the HVAC unit. Such an HVAC unit may be ineffective to adequately condition the interior space of a sleeper cab, which is larger than the day cab.

Figure 2:
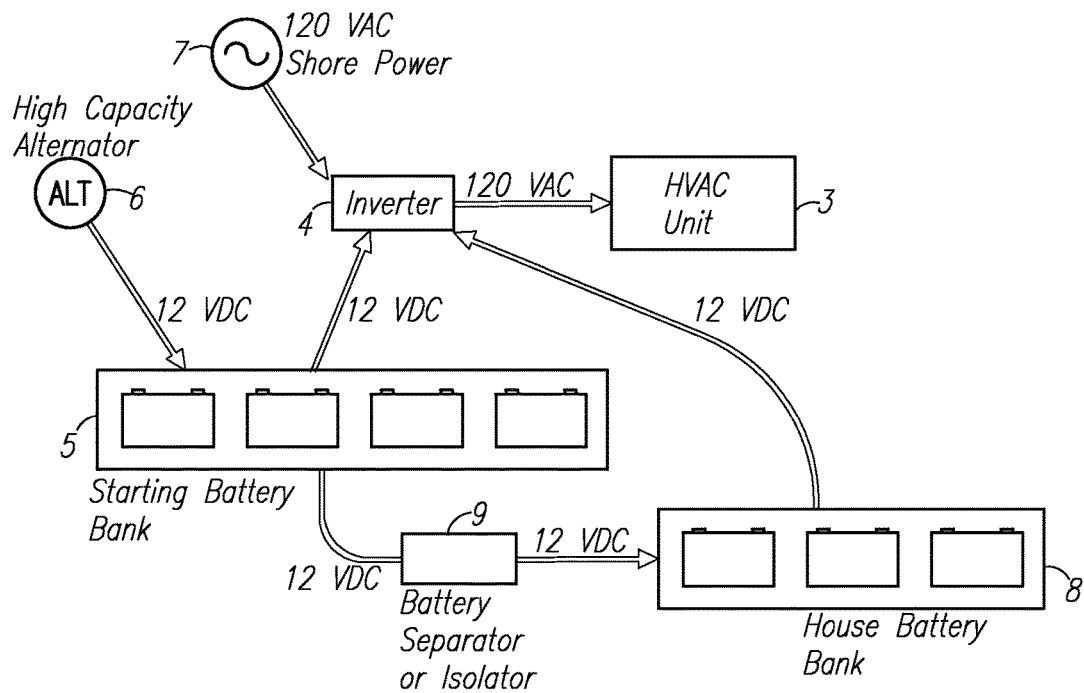
FIG. 2 is a schematic block diagram of a power supply system for a vehicle-mounted HVAC unit.

A power system for a vehicle-mounted HVAC system is shown schematically in FIG. 2. The HVAC unit 3 can be a day cab HVAC unit, such as an auxiliary day cab HVAC unit. The HVAC unit 3 is shown as being supplied by 120 Volts, alternating current (Vac). However, the HVAC unit could be adapted to be supplied by other and/or multiple voltages, such as 110 Vac, 240 Vac, or 220 Vac, for example.

An inverter 4 supplies approximately 120 Vac to the HVAC unit 3. The inverter 4 converts a direct current voltage (Vdc) to an ac voltage for use by the HVAC unit 3. In an embodiment, the inverter 4 converts a dc voltage of approximately 12 Vdc to 120 Vac for use by the HVAC unit 3. An inverter 4 could be chosen depending on the available dc input voltage and desired ac output voltage, and the invention discussed herein is not limited to a particular inverter 4 or particular ac or dc voltage levels. The inverter 4 can be a modified sine wave inverter or a pure sine wave inverter. Example inverters are rated at 1,800 Watt, 2,000 Watt, 2,500 Watt, and 3000 Watt, respectively.

A battery 5 is connected to the inverter, to supply the dc input voltage to the inverter 4. In an embodiment, and as shown in FIG. 2, the battery 5 is a starting battery for the engine and includes additional batteries to form a battery bank. The primary purpose of a starting battery or starting battery bank is to supply electrical energy to the truck's starter motor (not shown), for starting the truck's engine. However, when the truck's engine is not running, the starting battery can be configured supply electrical energy to various loads, such as a stereo, interior lights, the HVAC unit 3, etc. As shown in FIG. 2, the battery 5 supplies electrical energy at approximately 12 Vdc to the inverter.

The inverter 4 includes a low voltage cut-out circuit to prevent discharging of the battery 5 to an undesirable level, for example to a level at which the truck's engine cannot be started. An example cut-out voltage level is 10.5 Vdc. When the battery voltage drops to or below 10.5 Vdc, the inverter prevents further discharging of the battery through the inverter. In an embodiment, the inverter's cut-out circuit can be remotely controlled via a control input at the inverter. For example, a control signal (e.g., a contact closure or a voltage signal) can be monitored by the inverter, and operations of the cut-out circuit controlled based on the state of the control signal. The control signal can be provided by the HVAC unit 3, which operates intermittently to heat or cool the interior of the day cab 2, so that the cut-out circuit prevents discharging of the battery 5 whenever the HVAC unit 3 does not need to operate.

Example batteries are deep-cycle absorbed glass mat type batteries and flooded lead-acid type batteries. Example batteries are rated at 75 Ampere-hours (Ah) or less. In an embodiment, the batteries have an appropriate Ampere-hour rating for allowing operation of the HVAC unit 3 for a duration of 3 hours or less while the truck's engine is not running. It is to be appreciated that batteries can be selected, based on their Ampere-hour rating, for allowing operation of the HVAC unit 3 for a duration exceeding 3 hours.

In an embodiment, the truck includes a battery box for holding the battery 5 or battery bank. The battery box can be mounted to a frame rail of the truck. In an embodiment, the inverter 4 is mounted within the battery box along with the battery 5.

An alternator, for example, a high capacity alternator 6, is driven by the truck's engine and provides a dc charging voltage for the starting battery bank 5 when the truck's engine is running. The truck's original alternator can be replaced with a high capacity alternator 6, if desired. The alternator 6 can have a current rating that is greater than 135 Amps, such as 185 Amps or 200 Amps, and the alternator can have an external regulator.

When the truck's engine is running, the HVAC unit 3 is supplied by approximately 120 Vac from the inverter 4. The inverter 4 is supplied by approximately 12 Vdc from the alternator 6 via the inverter's connection to battery bank 5. The battery bank 5 is charged by the alternator 6 while the engine is running.

When the truck's engine is not running, the HVAC unit 3 is supplied by the inverter 4, which is supplied by the battery bank 5. However, because the truck's engine is not running, the battery bank 5 is not charged by the alternator 6.

In an embodiment, the inverter 4 is adapted to receive an ac input from a power source external to the truck, such as a source of utility power or an external generator, for example. This is shown in FIG. 2 as a 120 Vac shore power source 7. Other shore power voltage levels could be supplied to the inverter 4, for example, 240 Vac. In an embodiment, the inverter 4 transforms a shore power voltage level to a voltage level suitable for use by the HVAC unit 3. When connected to the shore power source 7, the inverter 4 supplies the HVAC unit 3 with electrical power from the shore power source 7.

In an embodiment, the electrical power system includes an optional house battery bank 8 in addition to the starting battery bank 5. The house battery bank 8 is a bank of batteries that is dedicated to serving "house" loads when the truck's engine is not running. Example house loads include the HVAC unit 3, stereo equipment, a coffee maker, etc. The house battery bank allows house loads to be operated when the truck's engine is not running, without discharging the starting battery bank 5. Example house batteries are deep-cycle absorbed glass mat type batteries and flooded lead-acid type batteries.

The house battery bank 8 is connected to the inverter 4. When the truck's engine is not running, the HVAC unit 3 is supplied by the house battery bank 8 through the inverter 4. Accordingly, the HVAC unit 3 does not discharge the starting battery bank 5 when the truck's engine is not running. A battery separator or isolator 9 interconnects the starting battery bank 5 and the optional house battery bank 8 and allows the alternator to charge the house battery bank 8 when the engine is running, but prevents discharge of the starting battery bank 5 by the HVAC unit 3 when the engine is not running. The battery separator or isolator 9 can include a current-blocking device to prevent undesired current flow between the starting battery bank 5 and the house battery bank 8. For example, the battery separator or isolator 9 can include diodes to prevent undesired current flow. The battery separator or isolator 9 can also include controlled switching devices to prevent undesired current flow, such as relays, solenoids, contactors, transistors, and the like. The battery separator or isolator 9 can prevent the flow of current from the starting battery bank to the house battery bank 8.

Figure 3:
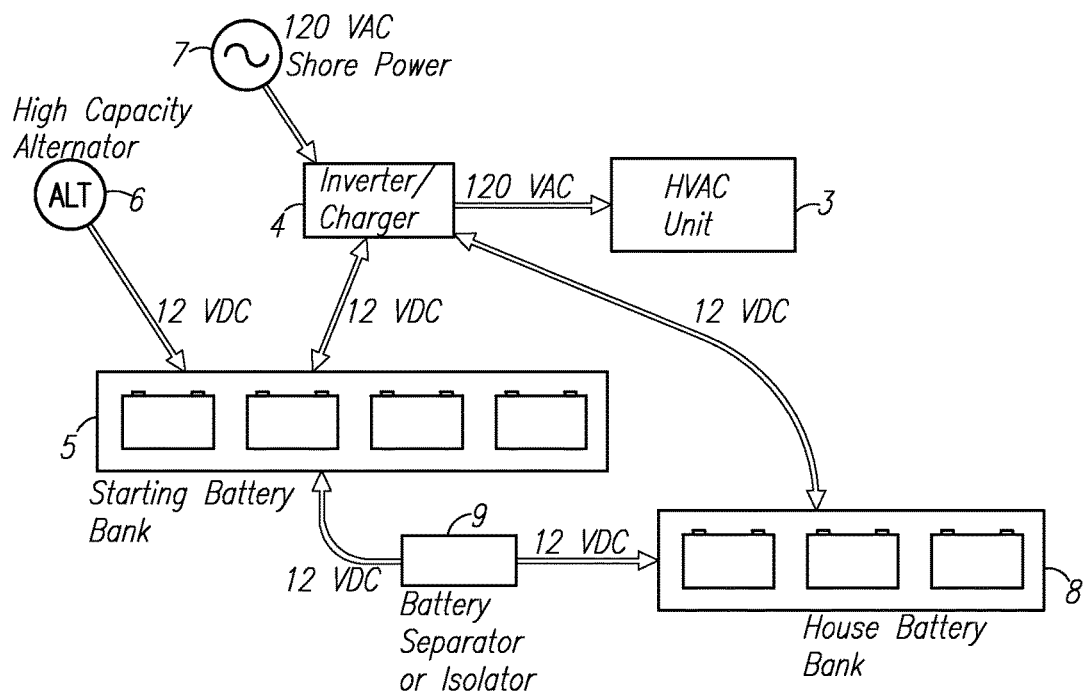
FIG. 3 is a schematic block diagram of a power supply system for a vehicle-mounted HVAC unit.

In the embodiment of FIG. 3, the inverter 4 also functions as a battery charger. When the inverter 4 is connected to shore power 5, the inverter supplies a charging voltage to the starting battery bank 5 and/or the house battery bank 8.

Figure 4:
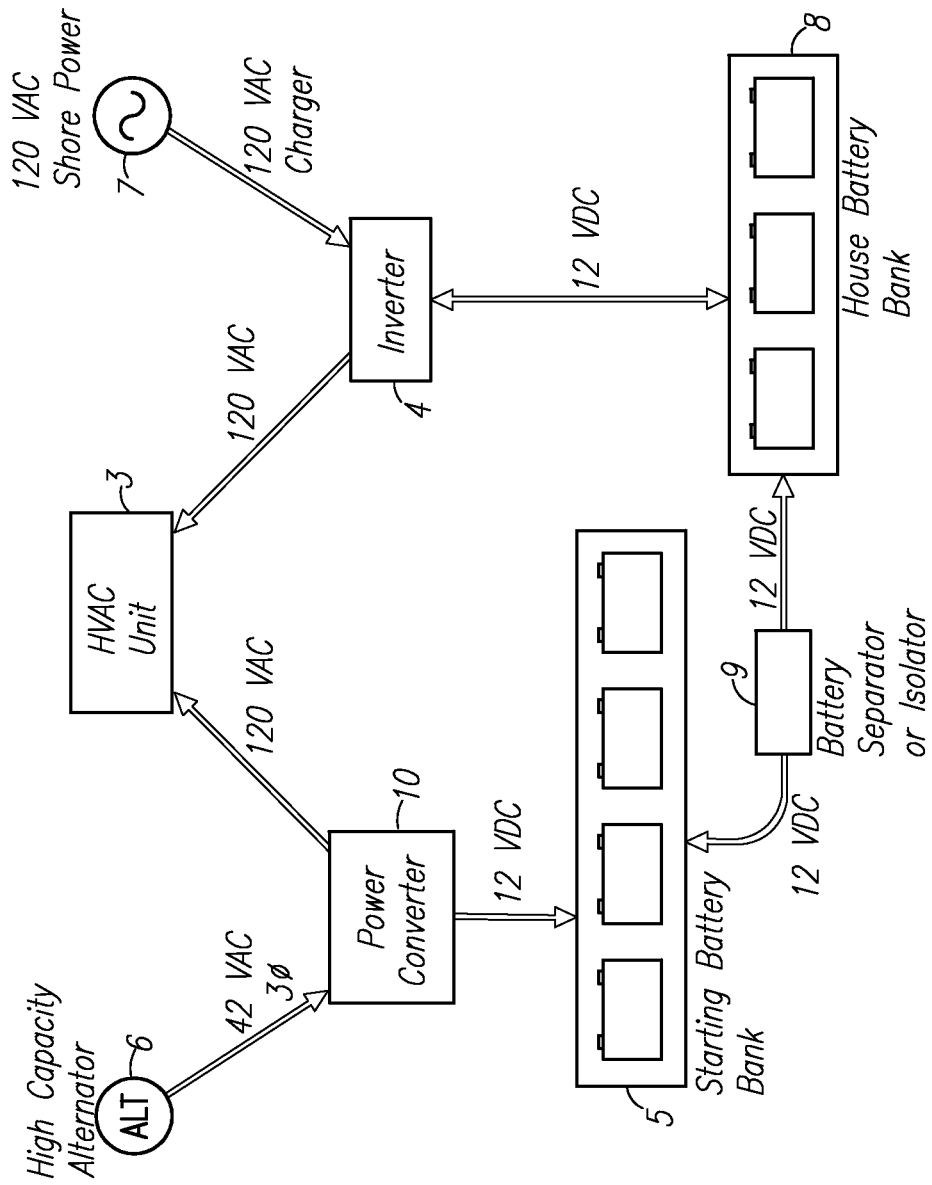
FIG. 4 is a schematic block diagram of a power supply system for a vehicle-mounted HVAC unit.

In the embodiment of FIG. 4, the alternator 6 produces three-phase, ac power. For example, the alternator produces approximately 42 Vac, three-phase power. The alternator 6 supplies three-phase ac power to a power converter 10. The power converter 10 converts three-phase ac power from the alternator 6 to a dc voltage, for example, approximately 12 Vdc, to charge the starting battery bank 5, and an ac voltage, for example, approximately 120 Vac, to supply power to the HVAC unit 3. An example power converter 10 is sold under the tradename MOBILE POWER GENERATOR MPG-30. The power converter 10 supplies converted power from the alternator 6 to the starting battery bank 5 and HVAC unit 3 when the truck's engine is running. When the truck's engine is not running, the power converter 10 does not supply power to the starting battery bank 5 or the HVAC unit 3.

The system of FIG. 4 includes a house battery bank 8 connected to the starting battery bank 5 through a battery separator or isolator 9. The house battery bank 8 is connected to an inverter 4, which is connected to the HVAC unit 3. When the truck's engine is not running, the power converter 10 does not supply power to the HVAC unit 3. Instead, the inverter 4 supplies power to the HVAC unit 3 from the house battery bank 8. The inverter 4 can be adapted to receive shore power 7 to supply power to the HVAC unit 3. The inverter 4 can also function as a battery charger as described above with respect to FIG. 3.

In an embodiment, the power converter 10 includes an integral inverter (not shown) for supplying ac power to the HVAC unit 3 from the starting battery bank 5 and/or a house battery bank 8. The power converter's 8 integral inverter allows the power converter 10 to supply ac power to the HVAC unit 3 even when the truck's engine is not running.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A truck, comprising:
an alternator having a direct current electrical power output;
a combined inverter and charger unit having an alternating current electrical power output;
a house battery;
a starting battery for starting an engine of the truck, the combined inverter and charger unit configured to charge both of the house battery and the starting battery;
a day cab forming an interior space; and
a climate control unit for conditioning the interior space of the day cab, wherein the climate control unit is adapted to be powered by an alternating current electrical source, wherein the climate control unit is powered by the alternator through the combined inverter and charger unit, and independent of the house battery, when an engine of the truck is running, and is powered by either the house battery or the starting battery through the combined inverter and charger unit when the engine is not running, and wherein the combined inverter and charger unit is configured to be connected to an alternating current shore power source having an alternating current voltage level to thereby supply the climate control unit with electrical power from the alternating current shore power source and also to charge both the house battery and the starting battery with a charging voltage, wherein the electrical power supplied to the climate control unit by the combined inverter and charger unit when connected to the alternating current shore power source is either at the alternating current voltage level of the alternating current shore power source or at a transformed alternating current voltage level transformed by the combined inverter and charger unit from the alternating current voltage level.

2. The truck as set forth in claim 1, wherein the truck is a tractor adapted for pulling a semitrailer.

3. The truck as set forth in claim 1, wherein the truck further includes a battery isolator for preventing a flow of current from the starting battery to the house battery and thereby prevents discharge of the starting battery when the engine is not running, while allowing the alternator to charge the house battery when the engine is running.

4. The truck as set forth in claim 1, wherein the starting battery or the house battery is an absorbed glass mat battery.

5. The truck as set forth in claim 4, further comprising an additional absorbed glass mat battery.

6. The truck as set forth in claim 5, wherein the starting battery and the house battery have Ampere-hour ratings that are not greater than 75 Ampere-hours.

7. The truck as set forth in claim 5, wherein a conditioning capacity rating of the climate control unit is a cooling capacity rating that is within a range of about 7,000 British thermal units per hour (Btu/hr) to about 10,000 Btu/hr.

8. A truck, comprising:
an engine;
an alternator driven by the engine;
a starter motor for starting the engine;
a combined inverter and charger unit having an alternating current electrical power output;
a day cab forming an interior space;
a climate control unit for conditioning the interior space of the day cab, wherein the climate control unit is adapted to be powered by an alternating current electrical source, and wherein the climate control unit is powered by the alternator through the combined inverter and charger unit when the engine is running; and
a battery for supplying electrical energy to the starter motor, wherein the combined inverter and charger unit is configured to charge the battery, wherein said battery supplies electrical energy to the climate control unit through the combined inverter and charger unit to power the climate control unit when the engine is not running, and wherein the combined inverter and charger unit is configured to be connected to an alternating current shore power source having an alternating current voltage level to thereby supply the climate control unit with electrical power from the alternating current shore power source and also to charge the battery with a charging voltage when connected to the alternating current shore power source, wherein the electrical power supplied to the climate control unit by the combined inverter and charger unit when connected to the alternating current shore power source is at a transformed alternating current voltage level transformed by the combined inverter and charger unit from the alternating current voltage level.

9. The truck as set forth in claim 8, further comprising an additional battery, wherein the combined inverter and charger unit charges the battery and the additional battery, and the battery and said additional battery form a battery bank for supplying electrical energy to the climate control unit through the combined inverter and charger unit to power the climate control unit when the engine is not running.

10. The truck as set forth in claim 9, wherein the battery and said additional battery have Ampere-hour ratings that are not greater than 75 Ampere-hours.

11. The truck as set forth in claim 9, wherein the battery and said additional battery are absorbed glass mat batteries.

12. The truck as set forth in claim 9, wherein the climate control unit has a cooling capacity rating that is not greater than about 7,000 British thermal units per hour (Btu/hr).

13. A method of modifying a truck, comprising:
providing the truck, the truck including:
an alternator having a direct current electrical power output;
a house battery;
a starting battery;
a day cab forming an interior space; and
a heating system for heating the interior space of the day cab;
installing a combined inverter and charger unit on the truck, the combined inverter and charger unit having an alternating current electrical power output; and
installing an auxiliary HVAC unit on the truck, wherein the auxiliary HVAC unit is adapted to be powered by an alternating current electrical source; and
wherein the auxiliary HVAC unit is powered by the house battery or the starting battery through the combined inverter and charger unit when an engine of the truck is not running, and wherein the combined inverter and charger unit is configured to be connected to an alternating current shore power source having an alternating current voltage level to thereby supply the auxiliary HVAC unit with electrical power from the alternating current shore power source and also to charge both the house battery and the starting battery with a charging voltage, wherein the electrical power supplied to the auxiliary HVAC unit by the combined inverter and charger unit when connected to the alternating current shore power source is either at the alternating current voltage level of the alternating current shore power source or at a transformed alternating current voltage level transformed by the combined inverter and charger unit from the alternating current voltage level.

14. The method as set forth in claim 13, further comprising installing a battery isolator for preventing a flow of current from the starting battery to the house battery and thereby preventing discharge of the starting battery when the engine is not running, while allowing the alternator to charge the house battery when the engine is running.

15. The method as set forth in claim 13, further comprising installing an absorbed glass mat battery on the truck.

16. The method as set forth in claim 13, wherein a conditioning capacity rating of the auxiliary HVAC unit is a cooling capacity rating that is within a range of about 7,000 British thermal units per hour (Btu/hr) to about 10,000 Btu/hr.

17. The method as set forth in claim 13, wherein the house battery and the starting battery form a battery bank for powering the auxiliary HVAC unit when the engine is not running.

18. The method as set forth in claim 13, further comprising replacing the alternator with another alternator having a current rating that is greater than 135 Amps.

19. The method as set forth in claim 13, wherein each of the house battery and the starting battery have Ampere-hour ratings that are not greater than 75 Ampere-hours, and further wherein the auxiliary HVAC unit has a conditioning capacity rating that is not greater than 7,000 British thermal units per hour (Btu/hr).

* * * * *